(12) United States Patent
Beyer

(10) Patent No.: US 6,382,328 B1
(45) Date of Patent: May 7, 2002

(54) WEAR RESISTANT GROUND WORKING IMPLEMENT

(75) Inventor: John Beyer, Vermont (AU)

(73) Assignee: Stealthcorp Technologies Pty. Ltd., Knoxfield (AU)

( * ) Notice: Subject to any disclaimer, the term of this patent is extended or adjusted under 35 U.S.C. 154(b) by 0 days.

(21) Appl. No.: 09/720,127

(22) PCT Filed: Jun. 25, 1999

(86) PCT No.: PCT/AU99/00517

§ 371 Date: Mar. 19, 2001

§ 102(e) Date: Mar. 19, 2001

(87) PCT Pub. No.: WO00/00005

PCT Pub. Date: Jan. 6, 2000

(30) Foreign Application Priority Data

Jun. 26, 1998 (AU) ............................................. PP 4361

(51) Int. Cl.⁷ ........................... A01B 15/04; A01B 15/16
(52) U.S. Cl. ..................................................... 172/747
(58) Field of Search ................................ 172/747, 681, 172/719, 730, 731, 732, 733, 721, 723, 724, 772, 772.5, 776

(56) References Cited

U.S. PATENT DOCUMENTS 5,148,660 A    9/1992   Will ............................. 56/295

FOREIGN PATENT DOCUMENTS

| AU | 7401091 | 10/1991 |
| FR | 2679099 | 1/1993 |
| WO | 9714291 | 4/1997 |

*Primary Examiner*—Christopher J. Novosad
(74) *Attorney, Agent, or Firm*—Volpe and Koenig, P.C.

(57) ABSTRACT

A ground working implement formed from a hard substrate material such as steel has a forward facing ground cutting edge. A wear resistant coating (59, 63) such as polyurethane is applied to at least one face of the implement. The coating adjacent the cutting edge may have a cut (66), trench or line of weakness formed in it substantially parallel to the cutting edge. The implement may be a cultivator tillage point having a generally triangular shaped working portion with a nose (56) and a pair of wings swept back therefrom, with the leading edge of the nose and wings forming a cutting edge. The metal at the rear of the nose portion is stepped (58) in order to protect the leading edge of the plastics material immediately behind the nose.

10 Claims, 3 Drawing Sheets

WEAR RESISTANT GROUND WORKING IMPLEMENT

BACKGROUND AND SUMMARY OF THE INVENTION

This invention concerns the provision of wear resistant surfaces on ground working implements. It has particular but not exclusive application to wear-prone ground-engaging components used on agricultural cultivator components, such as tillage points plough shares, plough discs and the like, and on mining and earth-moving equipment.

This specification uses the term "tillage point" in its meaning as a general term which includes the type of agricultural tips or points used for scarifiers, sweeps, ground busters, seeder combines, direct drills and the like.

Farmers often routinely modify presently available tillage points by, for example, laying on hard facing materials from welding rods, or by welding onto the points additional metal such as stainless steel bolts. Longer tip life may be achieved but usually at the cost of significantly higher fuel consumption from the machinery pulling the modified points.

Great effort has been expended by many people in recent decades to develop harder and tougher steels and other materials for the manufacture of ground working implements such as the replaceable tips intended to engage and work the ground when mounted on agricultural and earth moving machines. It is known for such implements to have been constructed entirely of such newly developed alloys and systems have been developed for bonding inserts, such as tungsten carbide strips, or coatings of such harder materials onto the wearing edges. However such sophisticated alloys are relatively expensive, and hard inserts such as tungsten carbide have a tendency to fracture when cultivating ground containing rocks.

In the case of the common arrowhead shaped tillage points used on agricultural equipment, prior art developments have concentrated on protecting the upper surface of the leading edge of the point. An example of this type of development can be seen in patent specification AU-A-74010/91.

It is not only harder materials that have been proposed for this purpose. Patent specification WO 97/14291 describes how a point for an agricultural scarifier may be constructed with a polyurethane material applied to its outer surface in order to reduce wear of the scarifier point. The point has a core plate having a series of protrusions, indentations and holes formed in it and these help prevent separation of the protective polyurethane coating from the core plate during use.

It has now been observed that points made in accordance with the above patent specification WO 97/14291 can have a tendency for the polyurethane to delaminate from the steel substrate, particularly after the steel has partially worn away and particularly on the upper surface of the point. The present invention is directed to an alternative configuration whereby the likelihood of such delamination is greatly reduced.

Accordingly, in one aspect the invention provides a ground working implement having a cutting edge, said implement being formed from a rigid body of substrate material and a wear resistant coating applied to a face of the body up to the cutting edge, the coating adjacent the cutting edge having a cut, a trench or a line of weakness formed therein substantially parallel to the edge. Preferably the coating adjacent the cutting edge has a series of parallel cuts, trenches or lines of weakness formed therein substantially parallel to the edge. Preferably the coating is softer and more flexible than the substrate material and is preferably a polyurethane based plastics material. The implement may have a mounting portion by which the implement is adapted to be attached to an agricultural ground working implement and have a generally triangular shaped working portion comprising a nose portion and a pair of wings swept back therefrom, with the leading edge of the nose and wings forming said cutting edge.

In another aspect the invention provides a tillage point constructed as a metal body with wear resistant plastics material affixed thereto, said tillage point having a mounting portion by which it is adapted to be attached to an agricultural ground working implement and having a generally triangular shaped working portion comprising a nose portion and a pair of wings swept back therefrom, with the leading edge of the nose and wings forming a cutting edge and the metal at the rear of the nose portion stepped in order to protect the leading edge of the plastics material immediately behind the nose. Preferably the metal body is formed from sheet metal and, when aligned as for use, has the nose portion upwardly displaced to create said step. Preferably the upper surface of the nose does not carry a wear resistant covering of plastics material. Preferably a pad of wear resistant material fills the underside of the nose portion.

The wear resistant plastics material may be a polyurethane material bonded to the metal body in an injection moulding operation wherein the metal body is placed within the injection moulding die.

BRIEF DESCRIPTION OF THE DRAWINGS

Examples of the invention will now be described with reference to the attached drawings where.

DETAILED DESCRIPTION OF THE PREFERRED EMBODIMENTS

Figure 1:
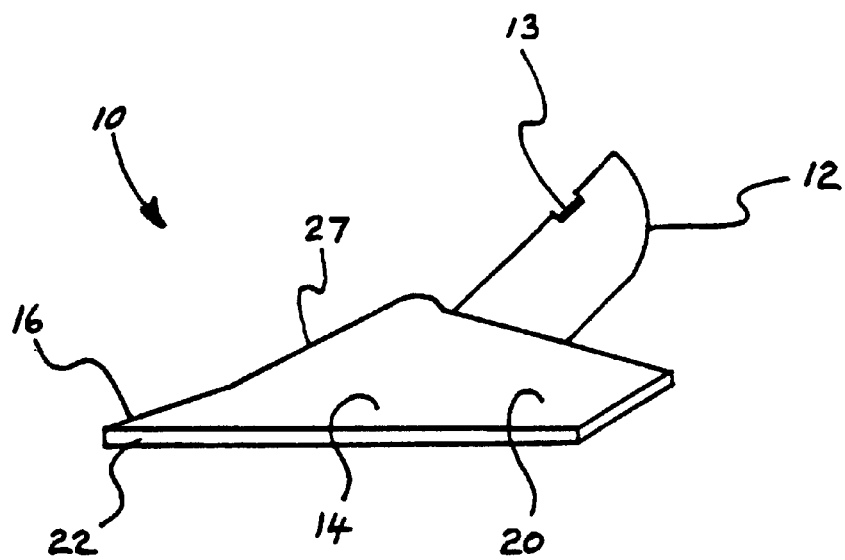
FIG. 1 is a side view of a prior art tillage point.
Figure 2:
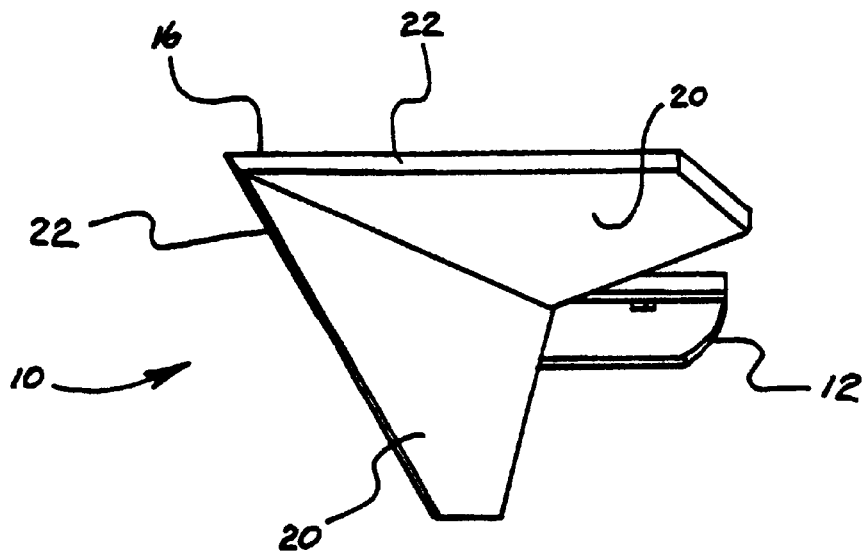
FIG. 2 is an underside perspective view of the point in FIG. 1.

Referring to FIGS. 1 and 2, the tillage point 10 has a mounting portion 12 extending upwards and rearwards which has a hole 13 for fastening the point to a scarifier (not shown). The mounting portion 12 is integrally formed with a working portion 14 of the point 10. The working portion 14 has a nose portion 16 at its front extremity and wings 20 extending laterally. The general plane of each wing 20 is angled relative to the other so that a rounded ridge 27 runs centrally along the upper surface from the mounting portion 12 to the nose portion. The leading edge of the tillage point 10, extending from the nose 16 down the front of both wings 20 is the cutting edge 22 and this is the edge which is pushed into the ground being cultivated. The top face of the working portion 14 is covered with polyurethane.

Figure 3:
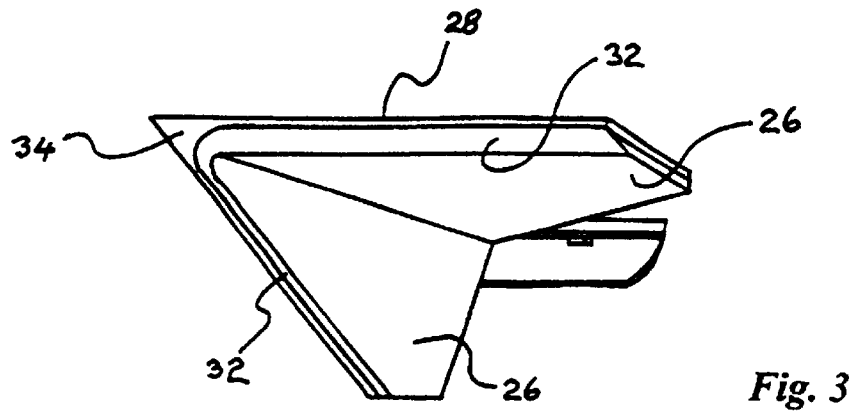
FIG. 3 is a similar view to that shown in FIG. 2 but with the point partly worn.
Figure 4:
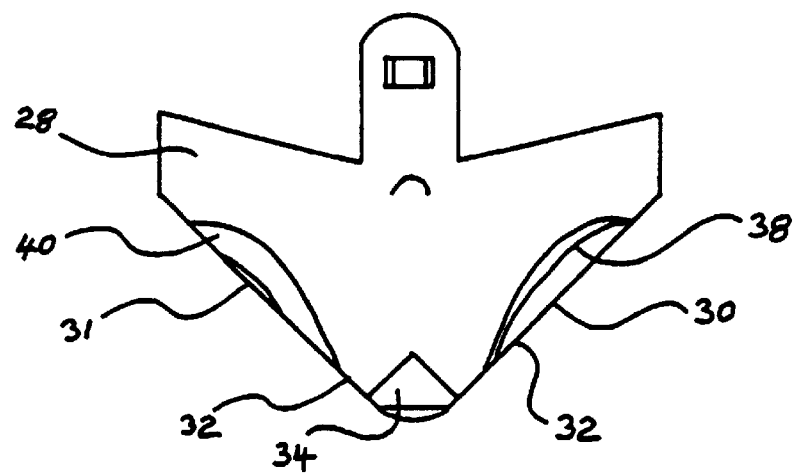
FIG. 4 is a plan view showing the partly worn tillage point of FIG. 3.

Referring to FIGS. 3 & 4, the point illustrated has deteriorated in such a manner that its metal body 26 has worn back further on its cutting edge 32 than has the overlying covering 28 of polyurethane on the top of the working portion of the point. At the nose a flap 34 of polyurethane protrudes over and beyond the worn metal, and at the regions 30 and 31 on the wings the polyurethane also protrudes forwards of the metal. Such overhang of the polyurethane covering makes it susceptible to be dragged upwards and backwards when the point is in use and such displacement of the covering substantially accelerates the rate of wear of the point and increases the ground penetration resistance of the point, increasing fuel consumption by the tractor pulling the scarifier.

In FIG. 4, at a region 30 on the cutting edge of one of the wings a loose portion 38 of the polyurethane has been bent upwards much like the flap 34 at the nose. On the cutting edge of the other wing, at a region 31 a portion 40 of polyurethane has separated from the underlying metal and has filled with soil which has been compacted into the crevice so created. The continued forcing of soil into such crevices, and the increased drag on the covering as it is forced away from the metal by the soil pushing into the crevices, can rapidly cause the covering on the top of the working portion of the tillage point to peel off in a single sheet. With the protective covering gone the metal wears much more quickly.

Figure 5:
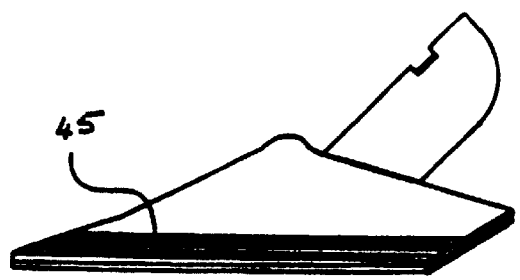
FIG. 5 is a side view of a point according to one embodiment of the present invention.

With reference to the embodiment of the present invention shown in FIG. 5, the point illustrated is substantially the same as that in FIG. 1 except that the polyurethane has a series of parallel thin slits 45 in it, through its full thickness, close to the cutting edge. By means of these slits, the overlying polyurethane is able to break away from the cutting edge in thin strips before it overhangs significantly, while still performing its wear resisting function up until that time.

As an alternative to the preferred arrangement of the slits passing through the full thickness of the covering as described above, they may be formed to pass only part way through the thickness of polyurethane, so leaving a weakened attachment which can readily be torn when the tillage point has worn by the appropriate amount. As a further alternative the slits may be replaced by narrow trenches which may pass fully or partially through the polyurethane. Yet another alternative would be for each slit or trench to be discontinuous along its length and this may take the form of a series of short slits like a dashed line, or a row of small holes, or any other line of weakness.

Figure 6:
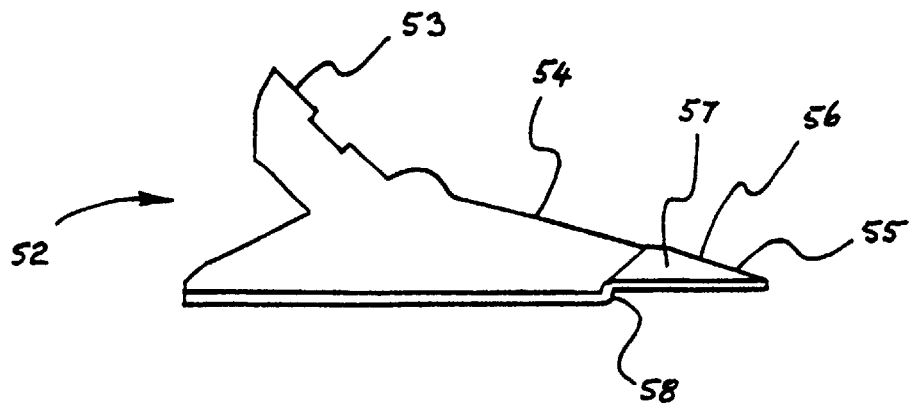
FIG. 6 is a side view showing the pressed metal body of a point according to another embodiment of the present invention.
Figure 7:
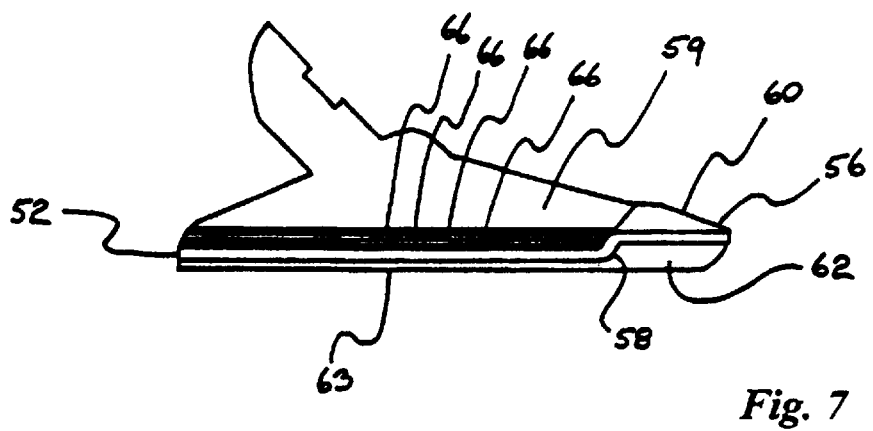
FIG. 7 is a side view of the body in FIG. 6 following the affixing of wear resistant polyurethane to complete manufacture of the point.
Figure 8:
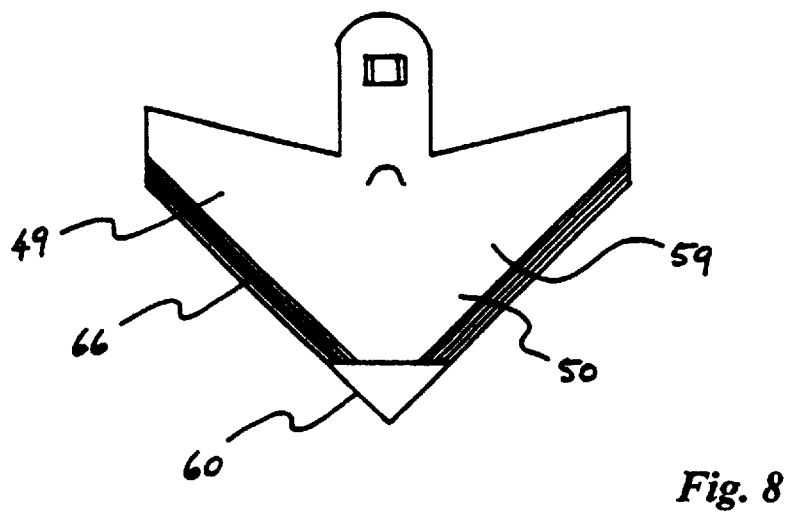
FIG. 8 is a plan view looking down upon the point shown in FIG. 7.

FIGS. 6 to 8 serve to illustrate another embodiment of the invention. With reference to FIG. 6, the metal body 52 of the tillage point is formed by pressing sheet metal into an appropriate form. The general shape is the same as that described with reference to FIG. 5, but in the body 52 the nose portion 56 is displaced upwards relative to its adjacent portions (including the wings) of the body to form a step 58. The displacement, and thus the height of the step, is about the thickness of the metal body. The nose portion 56 has two triangular planar segments, only one 57 of which is visible in FIG. 6, which join at a rounded central ridge which continues the line of the rounded ridge 54 on the remainder of the point towards the mounting portion 53.

As best seen in FIG. 7 the polyurethane covering 59 which is then affixed to the upper surface of the working portion butts up against the step 58 so that the step protects the leading edge of the covering at the nose. The polyurethane does not cover the top face 60 of the nose which is left as exposed metal. The underside of the wings 49 and 50 are also covered in a polyurethane layer 63 and the underside of the nose is filled with a pad 62 of polyurethane bonded to the metal body. The pad 62 is thus thicker than the polyurethane layer 63 under the wings, and the increased thickness is the height of the step 58.

Alternatively the polyurethane pad 62 may be replaced by an insert of appropriately hardened and toughened steel or other wear resisting material, and if this option is adopted, the hard insert would provide a downward step behind which the leading edge of layer 63 would be protected in a similar manner to the protection offered to the upper layer 59 by the upward step 59.

On each of the wings 49 and 50, the polyurethane bonded onto the upper surface of the wings carries four slits 66 through its thickness close to and parallel to the cutting edge to serve the purpose as discussed above in relation to FIG. 5.

The polyurethane is of a form suited to injection moulding and is preferably bonded to the steel body of the tillage point by firstly appropriately cleaning and priming the body and then introducing it into an appropriately shaped mould of an injection moulding machine. Reacting polyurethane is then introduced into the mould, where it is shaped and held against the body 52 where required, and cured in the mould.

As noted above, the polyurethane is preferably not intended to cover the top face 60 of the nose which is instead left as exposed metal. Nevertheless we have found from extensive testing that it is common when producing tillage points of the form described with reference to FIGS. 6 to 8, when injection moulding the polyurethane into contact with the metal body, to have the reaction m e wet the top face of the nose due to a less than perfect seal around it. This results in a thin film or flash of the reacted mixture adhering to the top face 60 of the nose. This film can be extremely thin to the point where it shows only as a faint bloom on the surface of the nose. Due to its extreme thinness, such a film does not have any significant effect on the abrasion resistance provided and the top face 60 of the nose so covered should not be considered to have a wear resistant polyurethane coating thereon within the context of this invention.

The metal from which the metal body is pressed is conveniently steel sheet of from 2 mm to 12 mm thick, depending on the span of the wings of the tillage point and the type of ground being tilled. The thickness of the coating is conveniently about the same as that of the steel. However the thickness of the pad 62 would be greater, as discussed above.

The wear resistant covering used in the present invention may be any suitable material but is preferably selected from the range of wear resistant polyurethanes widely supplied and known by the skilled person. It is preferably a thermoplastic urethane suitable for injection moulding applications and sold under the name Teton 90 by Urethane Compounds Pty Ltd in Australia. Use of a Chemloc (trade mark) primer from Lord Chemicals is also preferred in order to increase the bond between the polyurethane and steel substrate.

Throughout this specification, unless the context requires otherwise, the word "comprise", and variations such as "comprises" and "comprising", will be understood to imply the inclusion of a stated integer or group of integers but not the exclusion of any other integer or group of integers.

Finally, it is to be understood that various alterations, modifications and/or additions may be introduced into the constructions and arrangements of parts previously described without departing from the spirit or ambit of the invention. For example, although the tillage points illustrated in the Figures are all mounted to their relevant agricultural machines by way of a bolt or the like through the hole 13 in the mounting portion of the point, other mounting systems may be used. Suitable alternatives include the tapered knock-on and knock-off configurations widely used by some manufacturers of agricultural machinery.

What is claimed is:

1. A ground working implement having a cutting edge, said implement being formed from a rigid body of substrate material and a wear resistant coating applied to a face of the body up to the cutting edge, the coating adjacent the cutting edge having a cut, a trench or a line of weakness formed therein substantially parallel to the edge.

2. An implement according to claim 1 wherein the coating adjacent the cutting edge has a series of parallel cuts, trenches or lines of weakness formed therein substantially parallel to the edge.

3. An implement according to claim 1 wherein the coating is softer and more flexible than the substrate material.

4. An implement according to claim 1 wherein the coating is a polyurethane based plastics material.

5. An implement according to claim 1 and having a mounting portion by which the implement is adapted to be attached to an agricultural ground working implement and having a generally triangular shaped working portion comprising a nose portion and a pair of wings swept back therefrom, with the leading edge of the nose and wings forming said cutting edge.

6. A tillage point constructed as a metal body with wear resistant plastics material affixed thereto, said tillage point having a mounting portion by which it is adapted to be attached to an agricultural ground working implement and having a generally triangular shaped working portion comprising a nose portion and a pair of wings swept back therefrom, with the leading edge of the nose and wings forming a cutting edge and the metal at the rear of the nose portion stepped in order to protect the leading edge of the plastics material immediately behind the nose.

7. A tillage point according to claim 6 wherein the metal body is formed from sheet metal and, when aligned as for use, has the nose portion upwardly displaced to create said step.

8. A tillage point according to claim 6 wherein the upper surface of the nose does not carry a wear resistant covering of plastics material.

9. A tillage point according to claim 6 wherein a pad of wear resistant material fills the underside of the nose portion.

10. A tillage point according to claim 6 wherein the wear resistant plastics material is a polyurethane material bonded to the metal body in an injection moulding operation wherein the metal body is placed within the injection moulding die.

* * * * *